United States Patent [19]

Tabata et al.

[11] Patent Number: 4,839,217
[45] Date of Patent: Jun. 13, 1989

[54] AROMATIC POLYIMIDE FILM

[75] Inventors: Kanzo Tabata; Hiroshi Inoue; Tadao Muramatsu; Yasuji Narahara, all of Hirakata, Japan

[73] Assignee: Ube Industries, Ltd., Ube, Japan

[21] Appl. No.: 50,729

[22] Filed: May 15, 1987

[30] Foreign Application Priority Data

May 16, 1986 [JP] Japan .................................. 61-112146

[51] Int. Cl.$^4$ ........................... B32B 3/10; B32B 5/16; B32B 27/00
[52] U.S. Cl. ..................................... 428/156; 428/208; 428/323; 428/331; 428/458; 428/473.5; 428/900
[58] Field of Search ...................... 428/331, 473.5, 323, 428/900, 458, 208, 156

[56] References Cited

U.S. PATENT DOCUMENTS 4,612,235  9/1986  Ushimaru et al. .............. 428/331 X
4,624,892  11/1986  Ishizaki et al. ..................... 428/323
4,671,993  6/1987  Kadokura et al. .............. 428/331 X Primary Examiner—Thomas J. Herbert
Attorney, Agent, or Firm—Frishauf, Holtz, Goodman & Woodward

[57] ABSTRACT

An aromatic polyimide film containing very fine particles of an inert inorganic material having an average particle diameter of 40 to 1,000 angstroms in an amount of 0.02 to 6.0 wt. %, wherein a surface of the film is provided with extremely small sized protrusions having a maximum height of 50 to 500 angstroms and an average diameter of 50 to 2,000 angstroms, the number of protrusions is in the range of $2 \times 10^5$ to $1 \times 10^8/mm^2$, and the number of protrusions having a diameter of not less than 1.5 times as much as the average diameter is not more than 5% of the total number of the protrusions. This polyimide film is suitably employable as a support of a magnetic recording medium.

12 Claims, No Drawings

AROMATIC POLYIMIDE FILM

BACKGROUND OF THE INVENTION

1. Field of the invention

The present invention relates to an aromatic polyimide film provided with protruded and depressed portions on the surface.

2. Description of prior art

A polyethylene terephthalate film has been heretofore used as a substrate (i.e., support) of a magnetic recording medium, because the polyethylene terephthalate film is excellent in various properties such as heat resistance, mechanical strength and surface smoothness, and further is obtainable at a low cost. Recently, a higher density recording system, prolonged recording period, higher quality of recorded image or a smaller sized and light-weight medium are demanded, and hence a magnetic recording medium comprising a thin layer of a metallic material such as Co, Cr, Ni and Fe or an alloy thereof provided on a film support by utilizing sputtering or vacuum deposition has been widely developed.

When the metal thin layer is formed on the film support by the process such as sputtering, the temperature of the film rises over 200° C. due to an energy given by the collision of the metal particles to the film, even though such process is performed at room temperature without heating the film. Further, depending upon the nature of the employed metal, the film support may be heated at a temperature of higher than 200° C. to form a metal thin layer thereon in order to improve magnetic properties such as coercive force or to improve adhesion between the thin layer and the support. Accordingly, as the film support of a magnetic recording medium in which a magnetic recording layer is formed by the process such as sputtering or vacuum deposition, the polyethylene terephthalate film is not satisfactory because the film has not appropriate heat resistance. There is a process where a magnetic recording layer is formed on a film support having poor heat resistance such as a polyethylene terephthalate film by sputtering and the like, under the condition that the film support is cooled during the sputtering and the like. However, this method is disadvantageous, because the obtained magnetic recording layer sometimes decreases in the magnetic properties or shows unsatisfactory bonding strength.

For the above reasons, employment of an aromatic polyimide film having high heat resistance as a film support of a magnetic recording medium has been proposed.

The aromatic polyimide film, particularly an aromatic polyimide film obtained by reaction of an aromatic carboxylic acid compound mainly containing a biphenyltetracarboxylic acid and an aromatic diamine compound shows resistance to high temperatures of higher than 300° C., so that the aromatic polyimide film is considered to be favorable as a film support of a magnetic recording medium utilizing a metallic recording layer (i.e., magnetic recording medium having a magnetic recording layer formed by metallizing, etc.).

It is generally known that various properties of magnetic recording media such as electromagnetic conversion characteristics, smooth running properties and running endurance (or durability) greatly depend on the surface conditions of the magnetic recording layer. Hence, studies for improvements of the surface conditions of the magnetic recording layer have been earnestly made.

A metallic recording layer of a magnetic recording medium generally has a thickness of approx. 1,000 to 5,000 angstroms, and the layer is prominently thinner than that of the coated magnetic recording layer. Hence, the surface of the magnetic recording layer shows almost the same conditions (or shape) as those of the surface of the film support. Accordingly, provision of a favorable shape to a surface of the film support makes it possible to improve various properties of the magnetic recording layer (i.e., metal thin layer) such as electromagnetic conversion characteristics, smooth running property and running endurance. More specifically, if the surface of the film support is too rough, the distance between the magnetic recording layer and a magnetic head becomes too large in the recording and reproducing procedures, whereby the output level lowers due to so-called spacing loss. Further, existence of coarse protrusions on the surface of the film support causes drop-out phenomenon. On the contrary, if the surface of the film support is too smooth, there arise other problems although electromagnetic conversion characteristics do not deteriorate. For instance, the film shows a poor running property in the film-forming procedure or film-processing procedure. Further, when the film is used as a support of a magnetic recording medium such as a magnetic tape or a floppy disc, the resulting medium is markedly deteriorated in smooth running, running endurance, recovery from clogging on a head, etc.

For coping with the above-mentioned problems relating to running properties of a magnetic recording medium, there has been heretofore proposed a method of incorporating fine particles of an inorganic or organic material into the film support so as to provide a great number of small sized protruded and depressed portions on the surface of the film.

According to the studies of the present inventors, however, they have found that the heretofore proposed method of incorporating fine particles of those materials into the film support cannot provide such extremely small sized protruded portions as enable to decrease spacing loss. It has been also confirmed that relatively large sized protruded portions are formed and the diameter distribution of the protruded portions is wide, although the average diameter is small. Hence, occurrence of troubles in the electromagnetic conversion characteristics such as occurrence of drop-out phenomenon is not well prevented by the method.

SUMMARY OF THE INVENTION

It is an object of the present invention to provide an aromatic polyimide film which is provided with properly protruded and depressed portions on its surface.

It is another object of the invention to provide an aromatic polyimide film capable of providing a magnetic recording medium which is improved in running properties (i.e., smooth running), running endurance, recovery from clogging on a magnetic head, etc. in the case of using the film as a support of the magnetic recording medium.

There is provided by the present invention an aromatic polyimide film obtained from an aromatic tetracarboxylic acid compound mainly containing a biphenyltetracarboxylic acid compound and an aromatic diamine compound which contains particles of an inert inorganic material having an average particle diameter of 40 to 1,000 angstroms in an amount of 0.02 to 6.0 wt.%, wherein at least one surface of said film is provided with small sized protrusions having a maximum height of 50 to 500 angstroms and an average diameter of 50 to 2,000 angstroms, the number of protrusions is in the range of $2 \times 10^5$ to $1 \times 10^8$/mm$^2$, and the number of protrusions having a diameter of not less than 1.5 times as much as the average diameter is not more than 5% of the total number of the protrusions.

DETAILED DESCRIPTION OF THE INVENTION

An aromatic polyimide film of the invention is a film obtained from an aromatic tetracarboxylic acid compound mainly containing a biphenyltetracarboxylic acid compound and an aromatic diamine compound, and further provided with extremely small sized protrusions having a specific maximum height (i.e., roughness), a specific average diameter and a specific number on at least one surface.

The polyimide film of the invention is made of an aromatic polyimide obtained from an aromatic tetracarboxylic acid compound containing a biphenyltetracarboxylic acid compound such as 2,3,3',4'-biphenyltetracarboxylic acid, 3,3',4,4'-biphenyltetracarboxylic acid or dianhydrides of the acid in an amount of not less than approx. 15 mol%, and various kinds of aromatic diamine compounds.

As examples of the aromatic tetracarboxylic acid compound, there can be mentioned 3,3',4,4'-benzophenonetetracarboxylic acid, 2,2'-bis(3,4-dicarboxyphenyl)ether, 2,3,6,7-naphthalenedicarboxylic acid, bis(3,4-dicarboxyphenyl)methane, 2,2-bis(3,4-dicarboxyphenyl)propane, pyromellitic acid, dianhydrides of these acids, and mixtures thereof as well as the above-mentioned biphenyltetracarboxylic acids. Examples of the aromatic diamines employable in the invention include 4,4'-diaminodiphenyl ether, 3,4'-diaminodiphenyl ether, 4,4'-diaminodiphenyl thioether, 4,4'-diaminodiphenylmethane, 3,4'-diaminodiphenylmethane, 4,4'-diaminodiphenylpropane, 4,4'-diaminobenzophenone, o-phenylenediamine, m-phenylenediamine, p-phenylenediamine, and mixtures thereof.

The polyimide employed in the invention preferably is an aromatic polyimide comprising an acid moiety derived from 3,3',4,4'-biphenyltetracarboxylic acid, dianhydride thereof, 2,3,3',4'-biphenyltetracarboxylic acid or dianhydride thereof in an amount of not less than 20 mol%, preferably not less than 55 mol%. Since a film made of such aromatic polyimide shows high heat resistance, the film is almost free from deformation or occurrence of crease even when the film is exposed to a high temperature in a procedure of forming a metal thin layer on the surface thereof by a method of sputtering, metallizing (metal deposition) or ion plating.

For the preparation of the aromatic polyimide film of the invention, the aromatic diamine compound preferably comprises 30 to 100 mol% of a phenylenediamine and 0 to 70 mol% of a diaminodiphenyl ether. More preferably, the aromatic diamine compound comprises 40 to 95 mol% of a phenylenediamine and 5 to 60 mol% of a diaminodiphenyl ether. The aromatic tetracarboxylic acid compound preferably comprises 20 to 85 mol% of a biphenyltetracarboxylic acid compound in the form of a free acid, a dianhydride, an ester or a salt, and 15 to 80 mol% of a pyromellitic acid compound in the form of a free acid, a dianhydride, an ester or a salt.

An aromatic polyimide film prepared by starting materials having such composition shows physical properties such as very high second-order transition temperature, and a high elasticity. Typically, the aromatic polyimide film of the invention has a second-order transition temperature of not lower than 300° C., a low thermal expansion coefficient such as in the range of $1.0 \times 10^{-5}$ to $3.0 \times 10^{-5}$ cm/cm/°C., a modulus of elasticity of 300 to 900 kg/mm$^2$ and an elongation of at least 20%. Thus, the aromatic polyimide film prepared using a biphenyltetracarboxylic acid compound and a trimellitic acid compound in combination in the specific ratio has a relatively small thermal expansion coefficient which is close to the thermal expansion coefficient of an ordinary metal film or layer. Moreover, such aromatic polyimide film has high mechanical strength as well as satisfactory flexibility.

The extremely small sized protrusions on the aromatic polyimide film of the invention are formed on particles of an inert inorganic material having an average particle diameter of 40 to 1,000 angstroms which are uniformly dispersed within the film in such a manner that the particle of the inert inorganic material becomes a core of the protrusion. As the inert inorganic material particle, preferably employed is colloidal silica.

It is difficult to incorporate extremely fine particles of silica anhydride prepared by firing purified silicon tetrachloride, extremely fine particles of titanium dioxide or aluminum oxide prepared by the same vapor phase method, or other inorganic fine particles of dry and solid state into a solution for the preparation of an aromatic polyimide, so long as the incorporation is done by known procedures. In more detail, since these dry particles are generally in the agglomerated state, the agglomerates of the particles can be hardly divided into each particle in the solution for the preparation of an aromatic polyimide, even if the particles are subjected to a dispersing procedure using a conventional dispersing apparatus such as a homomixer, a sand mill or an ultrasonic homogenizer prior to introducing the particles into the solution for the preparation of aromatic polyimide. Hence, the resulting polyimide film are incorporated with a great number of agglomerated particles having a wide particle diameter distribution in which several to ten or more primary particles are agglomerated. In order to make the particle diameter distribution narrower, there can be utilized a method of classifying the particles by centrifugal separation, filtration, etc. However, even in the case of using such method, it is almost impossible to obtain preferred particles having such a narrow particle diameter distribution as to form extremely small sized protrusions specified in the invention, though particles of larger than a certain size can be removed.

Accordingly, as the inert inorganic material having an average particle diameter of 40 to 1,000 angstroms employable in the invention, preferred are colloidal silica and other particles having a similar particle diameter distribution to that of colloidal silica. Colloidal silica has a narrow particle diameter distribution in a liquid dispersion, and the particle diameter distribution hardly varies in a solution for the preparation of a polyimide film, so that colloidal silica is particularly advantageously employed for forming protrusions defined in the invention on the surface of the film.

Colloidal silica employable in the invention has an average diameter of 40 to 1,000 angstroms, preferably 100 to 500 angstroms. There is no specific limitation on the dispersion medium for the colloidal silica. For example, water, an organic solvent such as alcohol or an amide-type solvent, and mixtures thereof can be employed as the dispersion medium. Examples of colloidal silica include a variety of commercial products such as Snowtex (trade name, available from Nissan Chemical Co., Ltd.) and Cataloid (trade name, available from Catalyst Chemical Industries Co., Ltd.). The colloidal silica can be subjected to various treatments such as mechanical or ultrasonic dispersing procedure and classification through filtration or centrifugal separation, if desired.

The inert inorganic material particles are introduced into an aromatic polyimide film of the present invention in an amount of generally 0.02 to 6.0 wt.%, preferably 0.1 to 4.0 wt.%. When the amount of the inert inorganic material particles is less than 0.02 wt.%, satisfactory smooth running properties cannot be imparted to the resulting film. When the amount thereof exceeds 6.0 wt.%, the surface of the resulting film becomes too rough, and the mechanical properties of the film deteriorate.

The surface of the aromatic polyimide film of the invention is provided with extremely small sized protrusions having a maximum protruded height of 50 to 500 angstroms, an average diameter of 50 to 2,000 angstroms, and the number of $2 \times 10^5$ to $1 \times 10^8$/mm$^2$, preferably $5 \times 10^5$ to $5 \times 10^7$/mm$^2$, and further the number of protrusions having a diameter of not less than 1.5 times as much as the average diameter (i.e., rate of coarse protrusions) is not more than 5%, preferably not more than 3%, of the total number of the protrusions.

When the number of the protrusions having a diameter of not less than 1.5 times as much as the average diameter (hereinafter also referred to as "rate of coarse protrusions") exceeds 5% of the total number, deterioration of the electromagnetic conversion characteristics such as lowering of output level or increase of drop-out is brought about because of the presence of coarse protrusions. In addition, the coarse protrusions come into contact with a head or posts of the recording and reproducing device in the running procedure to decrease running endurance of the magnetic recording medium.

When the number of the protrusions is less than $2 \times 10^5$/mm$^2$, satisfactory smooth running or running endurance is hardly imparted to a magnetic recording layer. When the number of the protrusions exceeds $1 \times 10^8$/mm$^2$, each particle lies one upon another to make a surface of the magnetic recording layer too rough, whereby the electromagnetic conversion characteristic deteriorate.

When the maximum height of the protrusions on the surface of the film is less than 50 angstroms, smooth running properties cannot be imparted. On the contrary, when the maximum height exceeds 500 angstroms, electromagnetic conversion characteristics deteriorate.

In the invention, the maximum height is a value determined using a feeler type-roughness measuring device (e.g., Talystep measuring device produced by Lanktailer Hobson Corp.) under the conditions of cut-off value of 0.33 Hz, longitudinal magnification of 200,000 times, traverse magnification of 2,000 times and measuring length of 50 μm according to a method based on JIS-B-0601.

The protrusions provided on the surface of the film are observed using a scanning electron microscope at magnification of 10,000 to 30,000 times (preferably approx. 20,000 times) to measure a diameter of each protrusion in five fields, and then the number distribution is determined. From a distribution curve of the number distribution, an average diameter of the protrusions is determined, and further the number of protrusions having a diameter of not less than 1.5 times as much as the average diameter is determined. It is desired to appropriately vary the magnification of the electron microscope according to diameters of the protrusions.

In the aromatic polyimide film of the invention, number of protrusions having a circular approximated diameter of not less than 1.5 times as much as the average circular approximated diameter is preferably not more than 13%, more preferably not more than 10%, of the total number of the protrusions.

The circular approximated diameter is determined in the same manner as above, using PIAS-IIE8 image processer to obtain a diameter of circular approximated area for the area of each protrusion.

The aromatic polyimide film of the invention can be formed by the process of introducing the aforementioned inert inorganic material particles such as colloidal silica into an aromatic polyamide acid (i.e., aromatic polyamic acid) or an aromatic polyimide solution and preparing a film using the solution containing the inert inorganic material particles.

In more detail, a dispersion containing fine particles of the inert inorganic material such as colloidal silica is added to a solvent for polymerizing aromatic polyimide such as an organic polar amide solvent (e.g., N-methylpyrrolidone, dimethylacetamide, dimethylformamide) or a phenol solvent (e.g., p-chlorophenol), and they are well mixed in a homomixer or an ultrasonic homogenizer to give a mixture. If necessary, the mixture may be dehydrated by distillation or the like to a certain degree so long as no adverse effect is given to the polymerization, or the mixture may be subjected to other treatments such as additional dispersing procedure and classification by means of filtration or centrifugal separation. Thus, a solvent dispersion of colloidal silica for polymerizing aromatic polyimide is obtained. To the dispersion may be directly added a monomer component which is a starting material for the preparation of polyimide such as an aromatic tetracarboxylic acid compound or an aromatic diamine compound to perform polymerization reaction, so as to prepare an aromatic polyamic acid (i.e., aromatic polyamide acid) or an aromatic polyimide solution (i.e., polyimide film-forming solution). Otherwise, to an initially polymerized aromatic polyamide acid or aromatic polyimide solution may be added the above-mentioned dispersion containing fine particles of the inert inorganic material such as a dispersion of colloidal silica. In each case, the dispersion is subjected to sufficient stirring to prepare a film-forming solution containing fine particles of the inert inorganic material highly dispersed therein, which is capable of forming a polyimide film satisfying the aforementioned conditions.

The film-forming solution containing the highly dispersed fine particles of the inert inorganic material prepared as above is cast on a metal drum or a metallic endless belt to form a film on the drum or the belt, and the film is then dried to give a self-supporting property to the film. The film is then separated (or peeled off) from the drum or the belt, and the separated film is again dried to imidize the film. Thus, an aromatic polyimide film of the present invention is prepared.

The polyimide film of the invention is made of a biphenyltetracarboxylic acid aromatic polyimide which has overall resistance of prominently high level to high temperatures. Hence, especially when the film is used as a support of a magnetic recording medium of metal thin film type, the film shows satisfactory heat resistance, even in the case that the film is subjected to various treatments such as sputtering, metallizing and ion plating with a magnetic metal (e.g., Co, Cr, Ni and Fe) or a magnetic alloy at high temperatures of approx. 200° to 600° C.

Further, since the surface of the aromatic polyimide film of the invention is provided with properly protruded and depressed portions, the favorable shapes of the protruded and depressed portions appear on a surface of a magnetic recording layer when the magnetic recording layer is formed on the polyimide film by means of sputtering, metallizing, ion plating, or the like. Accordingly, employment of the aromatic polyimide film of the invention can provide a magnetic recording medium which is excellent in various properties such as running property, running endurance, and recovery from clogging on a magnetic head, without providing no unfavorable effect to the electromagnetic conversion characteristics such as lowering of output level or occurrence of drop-out.

In more detail, in the magnetic recording medium using the aromatic polyimide film of the invention as the support, the protrusions are provided highly uniformly and only few coarse protrusions exist on the magnetic recording layer, so that drop-out is less occurs and stable output can be obtained. Further, since the surface of the magnetic recording layer has a maximum protruded height in an appropriate range, lowering of output level is hardly brought about. Furthermore, from the viewpoints of uniform shapes, small number of coarse protrusions, and a maximum protruded height and the number in appropriate ranges with respect to the protrusions on the surface of the magnetic recording layer, the magnetic recording medium using the polyimide film of the invention is excellent in smooth running, running endurance and recovery from clogging on a magnetic head.

The present invention is further illustrated by the following examples.

EXAMPLE 1

To 4 parts by weight of dimethylacetamide was added little by little 1 part by weight of an aqueous dispersion of colloidal silica (average particle diameter: 150 angstroms, concentration: 20 wt.%) under stirring at 8,000 rpm by the use of a homomixer to give a dispersion of colloidal silica in dimethylacetamide. The dispersion had water content of 15.8% by volume. Subsequently, the dispersion was subjected to vacuum distillation at 15 mmHg and 50° C., and then subjected to dispersing procedure for 6 hours by means of an ultrasonic homogenizer having output of 600 W, to prepare a dimethylacetamide dispersion of colloidal silica (concentration: 6.3 wt.%, water content: 0.78% by volume).

Independently, 30 mol% of 3,3',4,4'-biphenyltetracarboxylic acid dianhydride, 20 mol% of pyromellitic acid dianhydride, 15 mol% of diaminodiphenyl ether and 35 mol% of p-phenylenediamine (3,3',4,4'-biphenyltetracarboxylic acid dianhydride:pyromellitic acid dianhydride=60:40, molar ratio, and diaminodiphenyl ether:p-phenylenediamine=30:70, molar ratio) were dissolved in dimethylacetamide to give a solution, and the solution was stirred for 5 hours at 25° C. to perform polymerization. Thus, a polyamide acid solution having concentration of 18 wt.% and viscosity of 530 poise was obtained.

To the polyamide acid solution was added the dimethylacetamide dispersion of colloidal silica prepared as above in an amount of 1 wt.% (as silica) based on the amount of polyamide acid. The mixture was sufficiently stirred to prepare a film-forming polyamide acid solution containing homogeneously dispersed colloidal silica.

The solution was extruded onto a rotating metallic endless belt by means of a T-die to form a film of the extruded solution on the belt. The film formed on the belt was then dried by applying hot air of 80° to 130° C. to the surface of the film, so as to make a self-supporting film. The film was then continuously separated from the belt.

While being supported with pin tenters, the film was continuously moved in a high-temperature furnace with applying a hot air of 200°–450° C. to the surface of the film, so as to dry and imidize the film. Thus, an aromatic polyimide film having thickness of 12.5 μm was prepared.

The obtained aromatic polyimide film was examined on the surface condition (i.e., condition of protrusions on the surface). The results are as follows:

Maximum protruded height: 105 angstroms;
Average diameter: 800 angstroms;
Range of diameter: 500–2,000 angstroms;
Number of protrusions: $2.9 \times 10^7/mm^2$; and
Number of protrusions having a diameter of not less than 1.5 times of the average diameter (rate of coarse protrusions): 1.2% of the total number of protrusions.
Number of protrusions having a circular approximated diameter of not less than 1.5 times of the average circular approximated diameter: 4.8% of the total number of protrusions.

Further, physical properties of the obtained polyimide film were determined. The results are set forth below.

Tensile strength: 36.0 kg/mm$^2$
Elongation: 58%
Modulus of Elasticity: 510 kg/mm$^2$
Linear thermal expansion coefficient (100° to 300° C.): $2.1 \times 10^{-5}$ cm/cm/°C.
Second-order transition temperature (Tg) (determined by TMA tensile method using a sample of 5 mm width, load of 2 g, and temperature-elevating rate of 10° C./min.): 360° C.
Thermal decomposition initiating temperature: 440° C.

EXAMPLE 2

The procedure of Example 1 was repeated except for using an aqueous dispersion of colloidal silica having average particle diameter of 450 angstroms to give a dimethylacetamide dispersion of colloidal silica and adding the dimethylacetamide dispersion of colloidal silica in an amount of 4 wt.% in terms of silica based on the amount of polyamide acid, to prepare an aromatic polyimide film having thickness of 12.5 μm.

The obtained aromatic polyimide film was examined on the surface condition (i.e., condition of protrusions on the surface). The results are as follows:

Maximum protruded height: 159 angstroms;
Average diameter: 600 angstroms;

Range of diameter: 500–1,500 angstroms;
Number of protrusions: $1.3 \times 10^7/mm^2$; and
Number of protrusions having a diameter of not less than 1.5 times of the average diameter (rate of coarse protrusions): 1.6% of the total number of protrusions.
Number of protrusions having a circular approximated diameter of not less than 1.5 times of the average circular approximated diameter: 9.5% of the total number of protrusions.

Further, physical properties of the obtained polyimide film were determined. The results are set forth below.
Tensile strength: 35.8 kg/mm$^2$
Elongation: 57%
Modulus of Elasticity: 508 kg/mm$^2$
Linear thermal expansion coefficient (100° to 300° C.): $2.0 \times 10^{-5}$ cm/cm/°C.
Second-order transition temperature (Tg) (determined by TMA tensile method using a sample of 5 mm width, load of 2 g, and temperature-elevating rate of 10° C./min.): 360° C.
Thermal decomposition initiating temperature: 440° C.

COMPARISON EXAMPLE 1

To dimethylacetamide was added extremely small sized titanium dioxide having a primary particle diameter of 300 angstroms prepared by a vapor phase method in an amount of 4 wt.%, and they were mixed for 15 minutes at 8000 rpm by means of a homomixer to prepare a dispersion. The dispersion was then subjected to classification by filtering the dispersion over a complex filter capable of 100%-removing particles having a diameter of not smaller than 1 μm.

The procedure of Example 1 was repeated except for adding the above-obtained titanium dioxide dispersion in an amount of 1 wt.% in terms of titanium dioxide based on the amount of polyamide acid, to prepare an aromatic polyimide film having thickness of 12.5 μm.

The obtained aromatic polyimide film was examined on the surface condition (i.e., condition of protrusions on the surface). The results are as follows:
Maximum protruded height: 198 angstroms;
Average diameter: 1,700 angstroms;
Range of diameter: 1,000–6,500 angstroms;
Number of protrusions: $2.2 \times 10^6/mm^2$; and
Number of protrusions having a diameter of not less than 1.5 times of the average diameter (rate of coarse protrusions): 20.2% of the total number of protrusions.
Number of protrusions having a circular approximated diameter of not less than 1.5 times of the average circular approximated diameter: 21.3% of the total number of protrusions.

COMPARISON EXAMPLE 2

To dimethylacetamide was added extremely small sized silicon oxide having a primary particle diameter of 70 angstroms prepared by a vapor phase method in an amount of 2 wt.%, and they were mixed for 15 minutes at 8,000 rpm by means of a homomixer to prepare a dispersion. The dispersion was then subjected to classification by filtering the dispersion over a complex filter capable of 100%-removing particles having a diameter of not smaller than 1 μm.

The procedure of Example 1 was repeated except for adding the above-obtained silicon oxide dispersion in an amount of 1 wt.% in terms of silicon oxide based on the amount of polyamide acid, to prepare an aromatic polyimide film having thickness of 12.5 μm.

The obtained aromatic polyimide film was examined on the surface condition (i.e., condition of protrusions on the surface). The results are as follows:
Maximum protruded height: 128 angstroms;
Average diameter: 850 angstroms;
Range of diameter: 500–3,000 angstroms;
Number of protrusions: $1.9 \times 10^6/mm^2$; and
Number of protrusions having a diameter of not less than 1.5 times of the average diameter (rate of coarse protrusions): 20.7% of the total number of protrusions.
Number of protrusions having a circular approximated diameter of not less than 1.5 times of the average circular approximated diameter: 19.8% of the total number of protrusions.

COMPARISON EXAMPLE 3

To dimethylacetamide was added extremely small sized aluminum oxide having a primary particle diameter of 200 angstroms prepared by a vapor phase method in an amount of 3 wt.%, and they were mixed for 15 minutes at 8,000 rpm by means of a homomixer to prepare a dispersion. The dispersion was then subjected to a dispersing procedure for 6 hours by using an ultrasonic homogenizer having output of 600 W. Thus treated dispersion was classified by filtering the dispersion over a complex filter capable of 100%-removing particles having a diameter of not smaller than 1 μm.

The procedure of Example 1 was repeated except for adding the above-obtained aluminum oxide dispersion in amount of 1 wt.% in terms of aluminum oxide based on the amount of polyamide acid, to prepare an aromatic polyimide film having thickness of 12.5 μm.

The obtained aromatic polyimide film was examined on the surface condition (i.e., condition of protrusions on the surface). The results are as follows:
Maximum protruded height: 154 angstroms;
Average diameter: 1,250 angstroms;
Range of diameter: 800 to 7,000 angstroms;
Number of protrusions: $1.8 \times 10^6/mm^2$; and
Number of protrusions having a diameter of not less than 1.5 times of the average diameter (rate of coarse protrusions): 33.8% of the total number of protrusions.
Number of protrusions having a circular approximated diameter of not less than 1.5 times of the average circular approximated diameter: 25.6% of the total number of protrusions.

EVALUATION OF POLYIMIDE FILM

Each of the aromatic polyimide films prepared in the above-described examples was provided with a metal thin layer of Co-Cr having thickness of 0.2 μm on its surface by vacuum deposition. The film having the metal thin layer thereon was cut to give a video tape having width of 8 mm.

The obtained video tapes were evaluated on smooth running property, endurance (running endurance), output (reproduction output) and drop-out (DO) using a commercially available 8 mm type-video reproduction device and a drop-out counter. The results are set forth in Table 1.

The results of the evaluation were expressed on the basis of evaluated values with respect to a reference 8 mm type video tape in the case of using a commercially available 8 mm type video tape (using a polyethylene terephthalate film support) as the reference video tape.

The results of the evaluation are classified into the following.

A: superior to the reference 8 mm type video tape;
B: almost the same level as the reference 8 mm type video tape; and
C: inferior to the reference 8 mm type video tape.

TABLE 1

|  | Rate of Coarse Protrusions (%) | | Evaluation | | |
|---|---|---|---|---|---|
|  |  | Smooth Running | Running Endurance | Output | DO |
| Example 1 | 1.2 | 4.8* | B | A | A | A |
| Example 2 | 1.6 | 9.5* | B | A | A | A |
| Com. Ex. 1 | 20.2 | 21.3* | B | C | C | C |
| Com. Ex. 2 | 20.7 | 19.8* | B | C | C | C |
| Com. Ex. 3 | 33.8 | 25.6* | B | C | C | C |

Remark:
"*" means the rate according to the circular approximated diameter.

We claim:

1. A self-supporting aromatic polyimide film obtained by reaction of an aromatic tetracarboxylic acid compound mainly containing a biphenyltetracarboxylic acid compound, with an aromatic diamine compound; said film containing particles of an inert inorganic material having an average particle diameter of 40 to 1,000 angstroms in an amount of 0.02 to 6.0 wt.%, and at least one surface of said film being provided with small sized protrusions having a maximum height of 50 to 500 angstroms and an average diameter of 50 to 2,000 angstroms, the number of protrusions being in the range of $2 \times 10^5$ to $1 \times 10^8/mm^2$, and the number of protrusions having a diameter of not less than 1.5 times as much as the average diameter is not more than 5% of the total number of the protrusions.

2. The aromatic polyimide film as claimed in claim 1, wherein said particles of inert inorganic material are colloidal silica.

3. The aromatic polyimide film as claimed in claim 1, wherein the number of said protrusions is in the range of $5 \times 10^5$ to $5 \times 10^7/mm^2$.

4. The aromatic polyimide film as claimed in claim 1, wherein the number of the protrusions having a diameter of not less than 1.5 times as much as the average diameter is not more than 3% of the total number of the protrusions.

5. The aromatic polyimide film as claimed in claim 1, wherein the aromatic diamine compound comprises 30 to 100 mol% of a phenylenediamine and 0 to 70 mol% of a diaminodiphenyl ether.

6. The aromatic polyimide film as claimed in claim 1, wherein the aromatic diamine compound comprises 40 to 95 mol% of a phenylenediamine and 5 to 60 mol% of a diaminodiphenyl ether.

7. The aromatic polyimide film as claimed in claim 1, wherein the aromatic tetracarboxylic acid compound comprises 15 to 85 mol% of a biphenyltetracarboxylic acid compound and 15 to 85 mol% of a pyromellitic acid compound.

8. The aromatic polyimide film as claimed in claim 1, wherein number of protrusions having a circular approximated diameter of not less than 1.5 times as much as the average circular approximated diameter is not more than 13% of the total number of the protrusions.

9. The aromatic polyimide film as claimed in claim 1, wherein number of protrusions having a circular approximated diameter of not less than 1.5 times as much as the average circular approximated diameter is not more than 10% of the total number of the protrusions.

10. The aromatic polyimide film as claimed in claim 1, wherein the polyimide film has a second-order transition temperature of not lower than 300° C., a thermal expansion coefficient in the range of $1.0 \times 10^{-5}$ to $3.0 \times 10^{-5}$ cm/cm/°C., a modulus of elasticity of 300 to 900 kg/mm² and an elongation of at least 20%.

11. The aromatic polyimide film as claimed in claim 1 wherein the aromatic tetracarboxylic acid compound is 2,3,3',4'-biphenyltetracarboxylic acid, 3,3',4,4'-biphenyltetracarboxylic acid 3,3',4,4'-benzophenonetetracarboxylic acid, 2,2'-bis(3,4-dicarboxyphenyl)ether, 2,3,6,7-naphthalenedicarboxylic acid, bis(3,4-dicarboxyphenyl)methane, 2,2-bis(3,4-dicarboxyphenyl)propane, pyromellitic acid, or a dianhydride of these acids, or a mixture thereof; and the aromatic diamine is 4,4'-diaminodiphenyl ether, 3,4'-diaminodiphenyl ether, 4,4'-diaminodiphenyl thioether, 4,4'-diaminodiphenylmethane, 3,4'-diaminodiphenylmethane, 4,4'-diaminodiphenylpropane, 4,4'-diaminobenzophenone, o-phenylenediamine, m-phenylenediamine, p-phenylenediamine, or a mixture thereof.

12. The aromatic polyimide film as claimed in claim 1, wherein the aromatic tetracarboxylic acid compound is 3,3',4,4'-biphenyltetracarboxylic acid, or a dianhydride thereof; 2,3,3',4'-biphenyltetracarboxylic acid or dianhydride thereof and the aromatic diamine compound comprises 30 to 100 mol% of a phenylenediamine and 0 to 70 mol% of a diaminodiphenyl ester.

* * * * *